(12) United States Patent
Cole et al.

(10) Patent No.: US 10,844,562 B2
(45) Date of Patent: Nov. 24, 2020

(54) DEPLOYMENT APPARATUS HAVING A TETHER ARM FOR AN INSPECTION VEHICLE

(71) Applicant: ABB POWER GRIDS SWITZERLAND AG, Baden (CH)

(72) Inventors: Gregory A. Cole, West Hartford, CT (US); William J. Eakins, Bloomfield, CT (US); Daniel T. Lasko, Bloomfield, CT (US); Harshang Shah, Bloomfield, CT (US); Thomas A. Fuhlbrigge, Ellington, CT (US); Luiz V. Cheim, Raleigh, NC (US); Poorvi Patel, Ballwin, MO (US); Biao Zhang, West Hartford, CT (US); Gregory F. Rossano, Enfield, CT (US); Saumya Sharma, Hartford, CT (US); Sangeun Choi, Simsbury, CT (US)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/434,676

(22) Filed: Jun. 7, 2019

(65) Prior Publication Data
US 2019/0323191 A1    Oct. 24, 2019

Related U.S. Application Data

(63) Continuation of application No. PCT/IB2017/001618, filed on Dec. 7, 2017.
(Continued)

(51) Int. Cl.
*E02B 3/06*    (2006.01)
*F03B 13/10*    (2006.01)
(Continued)

(52) U.S. Cl.
CPC .............. *E02B 3/062* (2013.01); *F03B 13/10* (2013.01); *E02B 15/04* (2013.01); *E02B 2017/0095* (2013.01)

(58) Field of Classification Search
CPC combination set(s) only.
See application file for complete search history.

(56) References Cited

U.S. PATENT DOCUMENTS

| 4,502,407 A * | 3/1985 | Stevens ............... E02B 17/0034 |
| | | 114/222 |
| 2016/0310223 A1 | 10/2016 | Moses et al. |

FOREIGN PATENT DOCUMENTS

| GB | 135941 A * | 12/1919 | ............... B25J 9/10 |
| JP | H09-19884 A | 1/1997 | |
| WO | WO 2008/041169 A2 | 4/2008 | |

OTHER PUBLICATIONS

International Search Report and Written Opinion of the International Searching Authority, PCT/IB2017/001618, dated May 11, 2018, 10 pages.

* cited by examiner

*Primary Examiner* — Kyle Armstrong
(74) *Attorney, Agent, or Firm* — Sage Patent Group (57) ABSTRACT

A deployment system for an inspection vehicle operable in a housing having a liquid medium is disclosed in the present application. The deployment system includes a mount connectable to the housing through an aperture formed in a wall thereof. An extendable arm is connected to the mount and positioned within the housing. A tether is slidably coupled to the extendable arm and adapted to connect with the inspection vehicle. A control mechanism is operable to control deployment of the tether and the position of the extendable arm.

29 Claims, 9 Drawing Sheets

Related U.S. Application Data

(60) Provisional application No. 62/431,317, filed on Dec. 7, 2016.

(51) Int. Cl.
*E02B 15/04* (2006.01)
*E02B 17/00* (2006.01)

DEPLOYMENT APPARATUS HAVING A TETHER ARM FOR AN INSPECTION VEHICLE

TECHNICAL FIELD

The present application generally relates to a tether arm and more particularly, but not exclusively, to a tether arm for deploying an inspection vehicle into a liquid filled housing, such as an oil cooled transformer or the like.

BACKGROUND

An apparatus with a liquid-filled housing such as a power transformer or the like needs periodic inspection and maintenance. Liquid-filled housings are configured to hold electrically powered components and are often extremely heavy and difficult to transport and/or replace. In-situ inspection and maintenance can be a desirable alternative to replacement of such an apparatus. It is possible to drain the liquid from the housing prior to inspecting and repairing internal components, however this is a time consuming and expensive process. Deployment of a liquid propelled inspection vehicle into a region of the housing that is free from interference with internal components can be difficult in some applications. Some existing systems have various shortcomings relative to certain applications. Accordingly, there remains a need for further contributions in this area of technology.

SUMMARY

One embodiment of the present application is a unique deployment system with a tether arm to facilitate deployment and removal of an inspection vehicle into and out of a liquid filled housing. Other embodiments include apparatuses, systems, devices, hardware, methods, and combinations for alternate tether arms in a vehicle deployment system. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Figure 1:
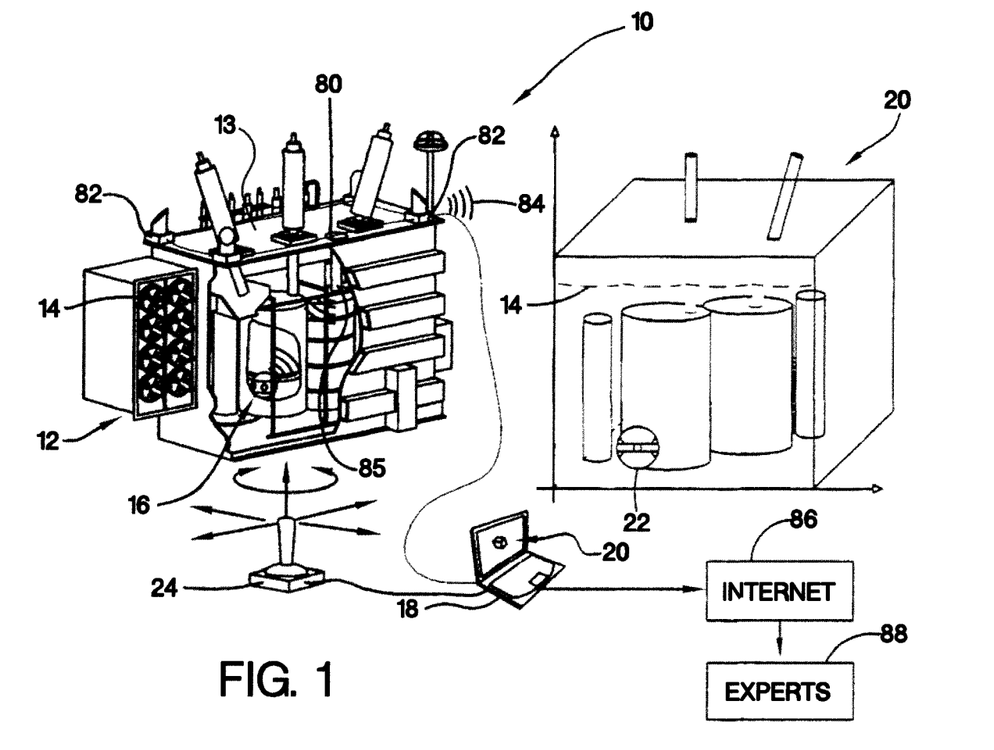
FIG. 1 is a schematic diagram of a system for in-situ inspection according to one exemplary embodiment of the present disclosure.

Referring to FIG. 1, a system for in-situ inspection of a liquid filled transformer designated generally by the numeral 10 is illustrated. It should be understood that while liquid filled electrical transformers are described and referenced in this application, the systems and methods described herein are not limited to liquid filled transformers, but on the contrary can be used with any liquid filled housing or container wherein physical inspection, data collection, data transmittal and repair procedures or the like are desired without prior draining of the liquid from the housing. By way of example, and not limitation, in-situ inspection may be performed on portions of ship hulls, electrical interrupters, high voltage switch gears, nuclear reactors, fuel tanks, food processing equipment, floating roof storage system, chemical storage tank, or other apparatuses of similar nature.

In one exemplary embodiment, the system 10 can be used for inspection, data transmittal and/or maintenance of a transformer 12. The transformer 12 contains high-voltage electrical components immersed in a cooling fluid 14 such as oil. Skilled artisans will appreciate that the inspection typically occurs when the transformer 12 is offline or not in use. The transformer 12 utilizes the cooling fluid 14 to maintain temperature and disburse heat generated by the internal components during operation of the transformer 12. In some embodiments, the cooling fluid 14 can include dielectric properties such that electrical conduction is reduced or entirely eliminated in the fluid 14. The transformer 12 can be maintained in a sealed configuration so as to prevent contaminants or other foreign matter from entering therein. As used herein, a "sealed configuration" of the tank or housing 13 allows for conduit ducts or other hardware associated with the transformer 12 to extend through a wall via a sealed joint formed with the housing 13 to allow for connection to electrical components and/or monitoring devices maintained in the housing 13. The housing 13 includes at least one opening to allow for ingress into and egress out of the housing 13. An inspection vehicle 16 sometimes referred to as a "robot," is insertable into the housing 13 of the transformer 12 and is controlled either by un-tethered wireless remote control or through a tether connection. In some embodiments an inspection vehicle or a separable portion thereof may be submersible without having self-propelled motion capability.

A computational device 18, such as a laptop computer or other appropriate computing device can communicate with the inspection vehicle 16 either by direct connection through a tether or wirelessly. The computer 18 may maintain a virtual transformer image 20 of the internal construction of the transformer 12. In some embodiments, this virtual image can be a computer-aided-design (CAD) image generated in construction or design of the transformer 12. However, in other forms, images such as photographs or actual real time video generated by sensors and cameras associated with the inspection vehicle 16 may be utilized. As will be described in further detail, the computer 18 may utilize the virtual transformer image 20 in conjunction with a virtual inspection vehicle 22, to represent the actual inspection vehicle 16, so as to monitor the positioning of the inspection vehicle 16 within the transformer 12. A motion control input device, such as a joystick 24 can be connected to the computer 18 and/or directly to the inspection vehicle 16 to allow an operator to control movement of the inspection vehicle 16 inside the transformer 12. Control of the inspection vehicle 16 can be aided by observations of the virtual inspection vehicle 22 as it moves about the virtual transformer image 20. In other words, an operator can control movement of the inspection vehicle 16 based on the observed position of the inspection vehicle 16 within the transformer 12. Other types of motion control input devices, such as those used in video games, handheld computer tablets, computer touch screens or the like may be employed without deviating from the teachings herein. It should be understood that in some applications the operator may be located on-site or near the apparatus to be inspected. However, in other applications the operator may be located off-site and indeed anywhere in the world through communication via World Wide Web internet connection.

Figure 2:
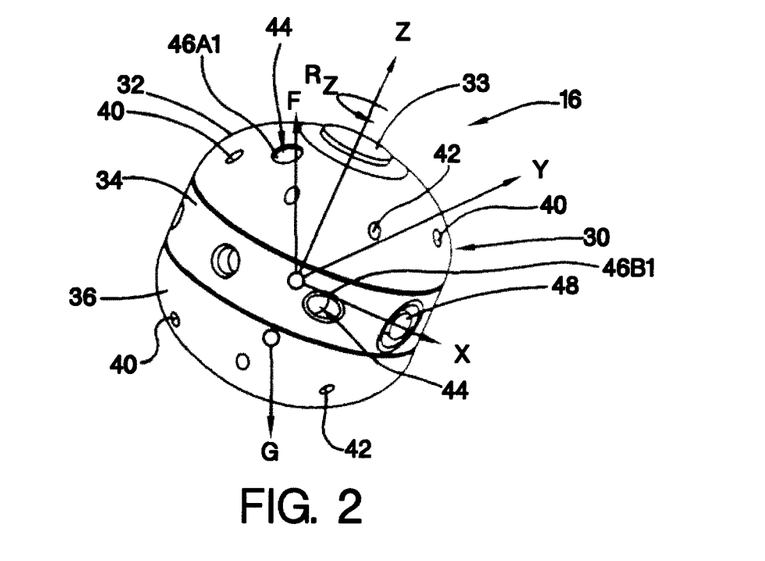
FIG. 2 is a perspective view of an inspection vehicle used within the system according to one exemplary embodiment of the present disclosure.
Figure 3:
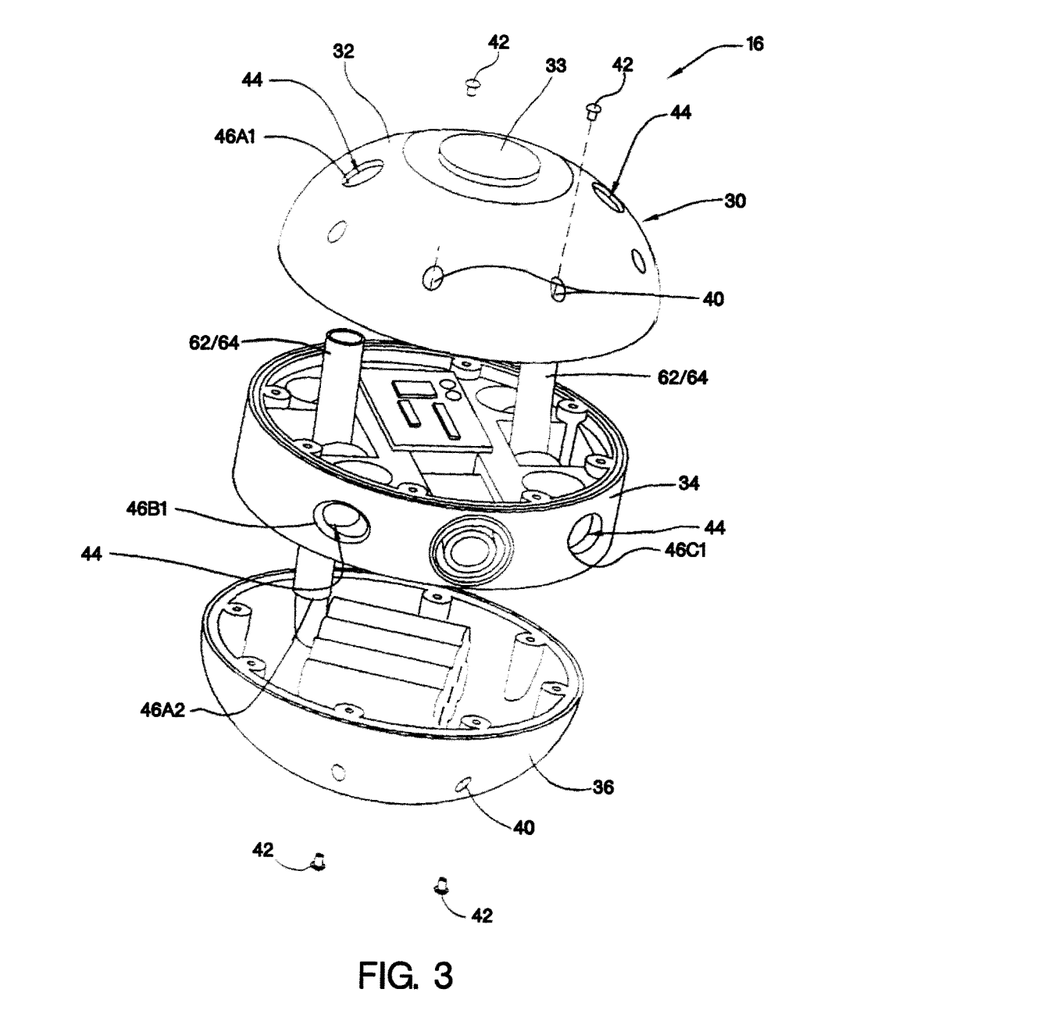
FIG. 3 is an exploded view of the inspection vehicle used within the system according to one exemplary embodiment of the present disclosure.
Figure 4:
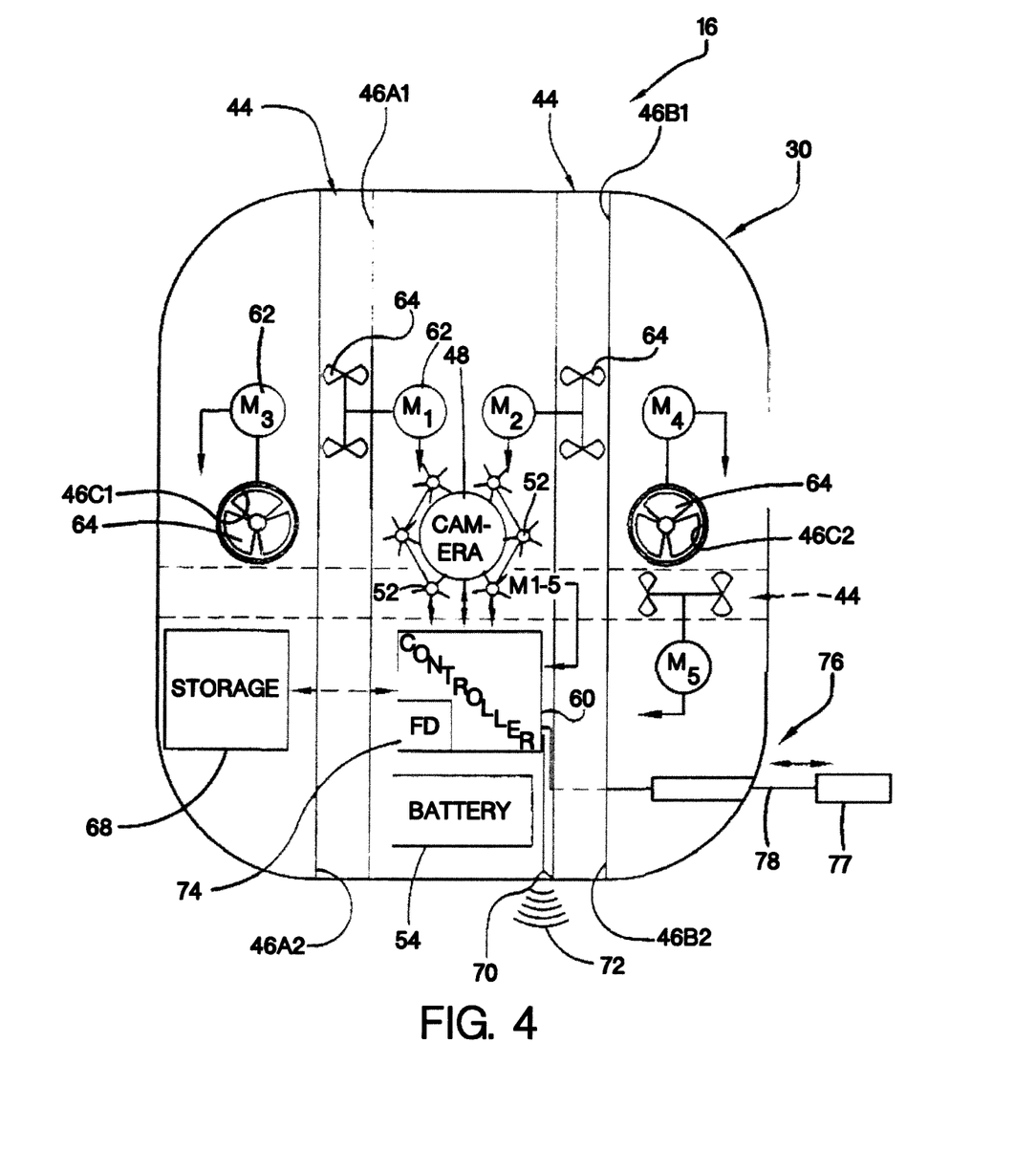
FIG. 4 is a schematic diagram of the inspection vehicle according to one exemplary embodiment of the present disclosure.

Referring now to FIGS. 2-4, the inspection vehicle 16 includes a vehicle housing 30 that is substantially cylindrical or spherical in construction with no significant protrusions or extensions that might otherwise be entangled with the internal components within the transformer 12. The vehicle housing 30 of the inspection vehicle 16 includes an upper cover 32 having a minimally extending nub 33, a middle section 34 and a lower cover 36. The nub 33 is sized so as to allow for grasping of the inspection vehicle 16 from within the transformer 12 by a tool or by an operator's hand. The nub 33 could have other shapes, such as a loop, to facilitate easy grasping, depending on the type of tool used to grasp the inspection vehicle 16. The cover 32, the middle section 34 and the cover 36 can be secured to one another with fastener apertures 40 that extend through at least the covers 32 and 36 so as to receive fasteners 42 to allow for attachment to the middle section 34. In most embodiments the fasteners 42 are maintained flush with the surface of the cover so as to minimize drag and prevent entanglement with internal components of the transformer 12. Other forms of mechanical fastening may be used, such as threaded engagement, press-fit, or mechanical clip or the like. Further, in some embodiments, the inspection vehicle 16 may only include two sections and in other embodiments the inspection vehicle 16 may include four or more sections.

Extending through the vehicle housing 30 are at least two pump flow channels designated generally by the numeral 44. These channels extend vertically and horizontally through the vehicle housing 30 and are configured so as to be sealed from the internal components of the vehicle housing 30. Each flow channel 44 provides a pair of ports 46. As shown in the drawings, numeric and alphabetic designations are provided so as to identify particular ports. For example, port 46A1 is at one end or side of the vehicle housing 30 while the opposite end of the flow channel 44 is designated by port 46A2. As such, the fluid maintained within the transformer can flow from one port 46A1 through and exit out port 46A2. In a similar manner, the oil may flow through port 46B1 and out through port 46B2. As will be discussed, components maintained within the channels move the fluid in either direction, through the inspection vehicle 16 and thus allow the inspection vehicle 16 to move within the transformer 12. It should be appreciated that alternate flow channel configurations could be implemented. For example, fluid could enter the inspection vehicle 16 through a single inlet and internal valves could route the fluid to all outlet ports. In another example, the vertical path could have one inlet port and two or more outlet ports. At least one sensor 48 is carried by the vehicle housing 30 and in some embodiments the sensor 48 is a camera. Other sensors can be used in some embodiments such as, by way of non-limiting examples, proximity sensors, acoustic sensors, electromagnetic sensors, voltage sensors, amperage sensors, pressure sensors and temperature sensors. The camera 48 is configured to receive and transmit images through a plurality of wavelength images of the internal components of the transformer 12. The wavelengths can include visible, infrared, or others as desired. These images allow an operator to monitor and inspect various components within the transformer 12.

In some embodiments, the vehicle housing 30 can include one or more light sources 52 which facilitate illumination of the area surrounding the inspection vehicle 16. In some embodiments the lights 52 can be light emitting diodes, but it will be appreciated that other illumination devices can be used. For example, one or more of the lights 52 can include ultraviolet (UV) frequencies that may be used to cure UV hardened adhesives or the like. The illumination devices are oriented so as to illuminate the viewing area of the camera 48. In some embodiments, the operator can control the intensity and wavelength of the light.

A battery pack 54 is maintained within the inspection vehicle 16 so as to power the internal components such as the sensor 48, the lights 52 and a controller 60. The controller 60 operates the sensor 48 and lights 52 and also controls operation of a motor 62 and a pump 64 which are used in combination with each of the provided pump flow channels 44. The controller 60 maintains the necessary hardware and software to control operation of the connected components and maintain the ability to communicate with the computer 18 as well as with other devices. The controller 60 provides functionality in addition to controlling the motion of the inspection vehicle 16. For example, the controller 60 can provide for a data recording function so that a high-resolution, high-speed video of the entire inspection area generated by the sensor 48 can be recorded and stored onboard by the storage device 68. On board storage may be used in instances where wireless streaming of the video is interrupted or the antenna transmission of the wireless signals has a lower than desired bandwidth. Skilled artisans will appreciate that the sensor 48 may also be a thermal camera, a sonar sensor, a radar sensor, a three-dimensional vision sensor, or any combination of sensors.

Each motor 62 is reversible so as to control the flow of fluid through the flow channels by the pump 64. In other words, each motor is operated independently of one another so as to control operation of the associated pump 64 such that rotation of the pump 64 in one direction causes the fluid to flow through the flow channel 44 in a specified direction and thus assist in propelling the vehicle housing 30 in a desired direction. The pump 64, which may also be referred to as a thruster pump, is shown as being a propeller type configuration, but other configurations such as a paddle-type pump or gear pump could be utilized.

In some embodiments, a single motor may be used to generate a flow of fluid through more than one channel. In other words, the vehicle housing 30 could provide a single inlet and two or more outlets. Valves maintained within the vehicle housing 30 could be used to control and re-direct the internal flow of the fluid and, as a result, control movement of the vehicle housing 30 within the transformer tank or housing 13. By coordinating operation of the motors with the controller, and thus the oil flowing through the vehicle housing 30, the inspection vehicle 16 can traverse all areas having sufficient space within the transformer 12. Moreover, the inspection vehicle 16 is able to maintain an orientational stability while maneuvering in the transformer tank or housing 13. In other words, the inspection vehicle 16 is stable such that it will not move end-over-end while moving within the transformer tank or housing 13. The vehicle housing 30 of the inspection vehicle 16 provides for a center of gravity designated by the capital letter G. The inspection vehicle 16 components are designed so that the center of gravity G is lower than the center of the buoyant force of the inspection vehicle 16 designated by the capital letter F. As skilled artisans will appreciate, this enables the inspection vehicle 16 to be provided with stability during traversal motion.

The vehicle housing 30 also carries a data storage device 68 which collects the data from the sensor 48 and is adequately sized to provide for storage of video or still images taken by a camera. The storage device 68 is connected to the controller 60 so as to provide for reliable transfer of the data from the sensor/camera 48 to the storage device 68. It will be appreciated that in some embodiments the storage device 68 is connected directly to the sensor 48 and the controller receives the data directly from the storage device 68. An antenna 70 is connected to the controller 60 for the purpose of transmitting data collected from the sensor 48 and also for sending and receiving control signals for controlling the motion and/or direction of the inspection vehicle 16 within the transformer 12, The antenna generates a wireless signal 72 that can be detected by the computer 18 or any intermediate device. A failure detection module 74 (designated as FD in FIG. 4) may be included in the controller 60 so as to shut down the internal components within the inspection vehicle 16 if a system failure is detected. For example, if a low battery level is detected by the controller 60, the module 74 and the controller 60 can begin a controlled shutdown of the inspection vehicle 16 which would cause the inspection vehicle 16 to float to the surface due to its positive buoyancy. In another example, a loss of connection to the remote system could also trigger a shutdown.

After floating to the surface, the vehicle housing 30 can be grasped by the nub 33. A borescope 76 may also be carried by the vehicle housing 30. One end of the borescope provides a camera 77 or other sensor connected to a retractable fiber-optic cable 78 which is connected at its opposite end to the controller 60, When in a retracted position the camera 77 is flush with the surface of the vehicle housing 30 so as to prevent entanglement with the components inside the transformer 12. When inspection of hard to view items is needed, such as the windings of the transformer 12, the cable 78 is extended while the inspection vehicle 16 is maintained in a stationary position. After images and other data are collected by the camera 77, the cable 78 is retracted. As a result, the borescope 76 allows further detailed inspection of the transformer 12.

As noted previously, the inspection vehicle 16 is configured so as to easily move around the obstacles within the transformer 12. The vehicle housing 30 is a cylindrical-shaped with sphere ends or sphere shaped configuration and is provided with a buoyant design so as to allow the inspection vehicle 16 to float to the top of the oil when it is powered off purposefully or accidentally. The inspection vehicle 16 is configured so as to allow for the thruster pumps 64 to move the inspection vehicle 16 around by selective actuation of each pump. As a result, the inspection vehicle 16 has four degrees of freedom or motion: X, Y, Z and rotation around Z. As a result, by controlling the direction of the pump thrusters 64, the inspection vehicle 16 can be easily moved.

Referring back to FIG. 1, it can be seen that the transformer 12 has at least one transformer hole 80. In general operation, the oil is inserted through any number of holes located in the top of the tank. Holes 80 may also be provided at the bottom of the tank to allow for the fluid to be drained. The holes 80 are provided with the appropriate plugs or caps. Accordingly, it will be appreciated that the size of the inspection vehicle 16 must be such that it can fit within the hole 80.

The transformer 12 may be configured with a plurality of transmit signal receivers 82 mounted on the upper corners, edges or other areas of the transformer 12, or in nearby proximity to the transformer 12. The transmit signal receivers 82 receive the wireless signal 72 from the inspection vehicle 16 to determine the position of the inspection vehicle 16 in the transformer tank or housing 13. The receivers 82 use triangulation, based on the signals 72 received or other methodology, to determine a position of the inspection vehicle 16 in the transformer tank or housing 13. This position information is then transmitted by a signal 84, either wired or wirelessly, to the computer 18. Additionally, the information collected by the sensor 48, such as visual data, is transferred to the computer or other visual receiving device separately. In other words, the informational data generated by the sensor 48 is transmitted to the computer 18 through the fluid and the tank wall with the openings 80. Use of these different communication paths may be used to prevent interference between the signals; however, some embodiments may utilize the same communication path to transfer data related to positioning, data information, and control information as appropriate. Reliable communication for the motion control of the inspection vehicle 16 and data/video streaming are required for the transformer 12 in-situ inspection. Utilizing the dielectric feature of the transformer coolant oil, the inspection vehicle 16 can be controlled by radio frequencies rather effectively. The video streaming for a Wi-Fi camera (e.g. 4.2 GHz) has been proven to be sufficient. To ensure reliable communication between the inspection vehicle 16 and the computer 18, a transceiver 85 may be inserted into the cooling oil tank through the service opening on the top of the transformer 12.

In most embodiments, the transceiver 85 is used to exchange data information from the sensor 48 and the camera 77, via the controller 60 to the computer 18; and motion control or maneuvering signals from the joystick 24 via the computer 18 to the controller 60 so as to operate the motors 62 and thrusters 64. The signal 84, transmitted by the receiver 82 is used by the computer 18 to provide a separate confirmation of the position of the inspection vehicle 16 within the transformer tank or housing 13.

The computer 18 receives the position signals 84 and information signals 72 and in conjunction with the virtual image 20 correlates the received signals to the virtual image so as to allow an operator to monitor and control movement of the inspection vehicle 16. This allows the operator to inspect the internal components of the transformer 12 and pay particular attention to certain areas within the transformer 12 if needed. By utilizing a virtual image of the internal features of the transformer 12 and the position of the inspection vehicle 16 with respect to those virtual features, the image obtained can be matched with the corresponding site inside the actual transformer tank or housing 13. Based on the visual representation of the transformer image 20 and the virtual inspection vehicle 22 in relation to the image, an operator can manipulate the joystick 24 response. The computer 18 receives the movement signals from the joystick 24 and transmits those wirelessly to the antenna 72, whereupon the controller 60 implements internally maintained subroutines to control the pump thrusters 64 to generate the desired movement. This movement is monitored in real-time by the operator who can re-adjust the position of the inspection vehicle 16 as appropriate.

In some embodiments the computer 18 can be connected to a network 86, such as the internet, so as to allow for the images or sensor data to be transferred to experts, who may be remotely located, designated by the block 88 so that their input can be provided to the operator so as to determine the nature and extent of the condition within the transformer 12 and then provide corrective action as needed. In some embodiments, control of the inspection vehicle 16 can also be transferred to an expert, who may be remotely located. In such embodiments, the expert would have another computer that can send control signals via a network to the local computer 18 that in turn sends signals to control the inspection vehicle 16 as described above.

Figure 5:
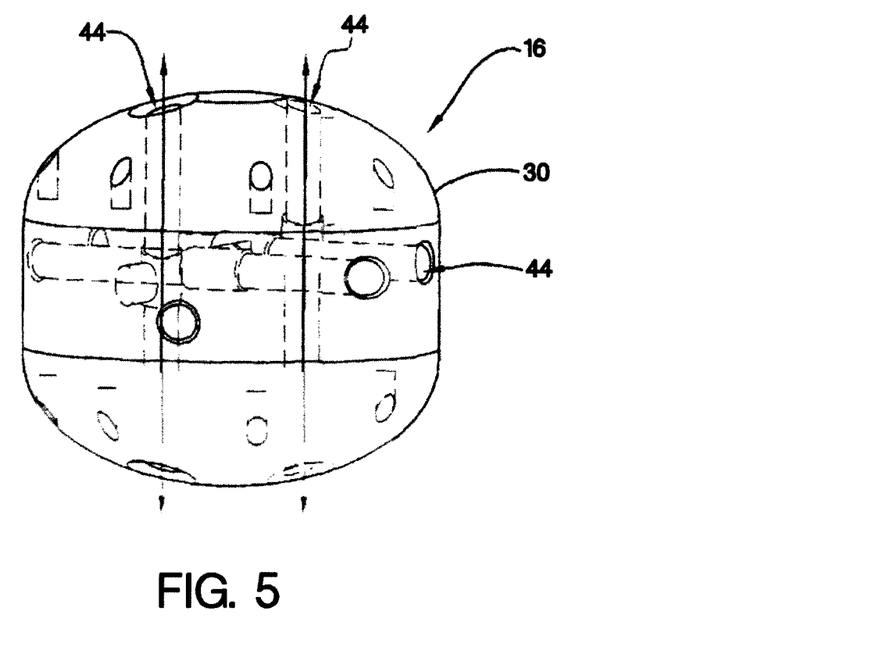
FIG. 5 is a schematic diagram of the inspection vehicle according to one exemplary embodiment of the present disclosure where two pumps under one control move the device in the Z direction.

Referring now to FIGS. 5-9, it can be seen that control of the motors and pump thrusters and their direction of fluid flow through the channels can control the motion of the inspection vehicle 16 within a fluid. For example, FIG. 5 shows the utilization of two pumps under one control so as to move the inspection vehicle 16 in a Z direction (see FIG. 2). To drive along the Z axis and to remain a stable depth, the Z axis thrusters have to run continuously. The Z thruster action can be controlled either manually by the operator or automatically by the controller. As used herein, the terminology "one control" refers to operating two pumps to operate in conjunction with one another so that the fluid flow is uniformly in one direction or the other.

Figure 6:
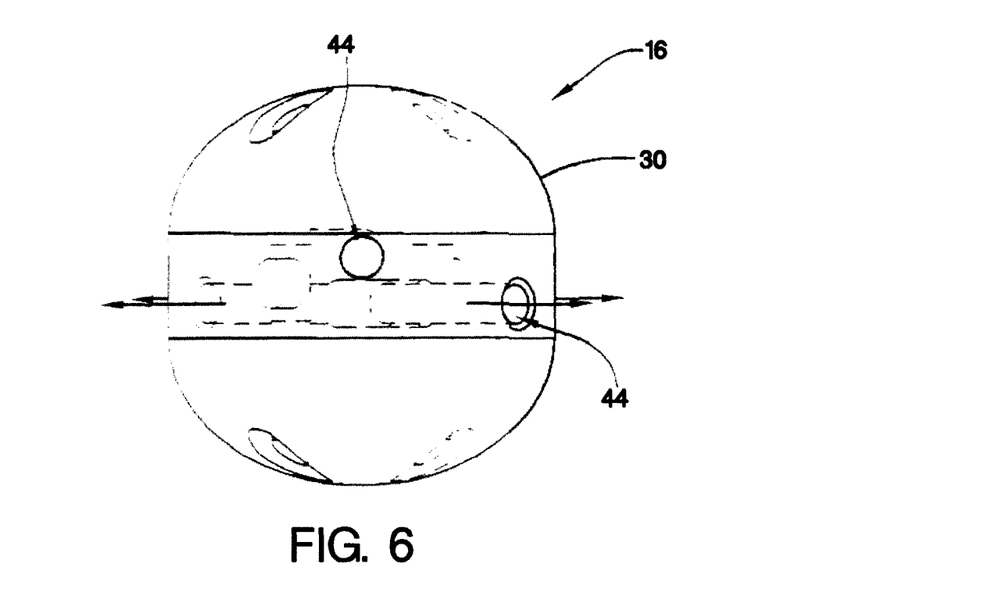
FIG. 6 is a schematic diagram of the inspection vehicle according to one exemplary embodiment of the present disclosure where two pumps under two controls move the device in the X direction.
Figure 7:
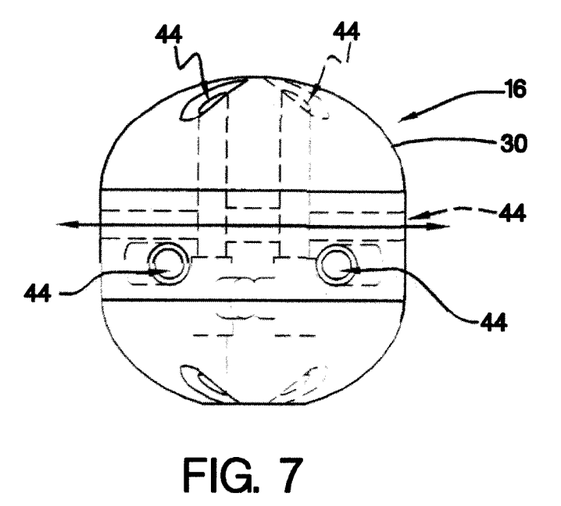
FIG. 7 is a schematic diagram of the inspection vehicle according to one exemplary embodiment of the present disclosure where a single pump under one control moves the device in the Y direction.

In FIG. 6 it can be seen that an X direction (see FIG. 2) can be obtained by utilizing two pumps under two controls so as to allow for movement in an X direction. As used herein, operation of "two pumps under two controls" means that the controller operates the pumps separately from one another. In FIG. 7 it can be seen that the inspection vehicle 16 is movable along the Y direction (see FIG. 2) wherein one pump is utilized under one control. It will be appreciated that FIG. 7 is a side view of FIG. 6 and at a slightly different elevation with respect to the X directional flow channels. As mentioned above, other embodiments could use different combinations of channels. For example, the three or four channels could exist in the Z direction. Also, other embodiments could have one inlet port and two outlet ports for a channel, or vice versa, or even use a different number of inlets and outlets. The number of pumps could also vary. For example, one pump could be used to control the flow of fluid from one inlet port which is then output through four outlet ports.

Figure 8A:
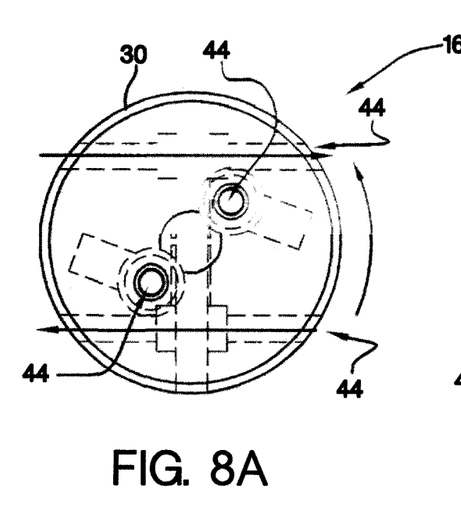
FIGS. 8A and 8B are schematic diagrams of the inspection vehicle according to one exemplary embodiment of the present disclosure wherein two pumps under one control operate to rotate the device in a counter-clockwise direction and in a clockwise direction, respectively.
Figure 8B:
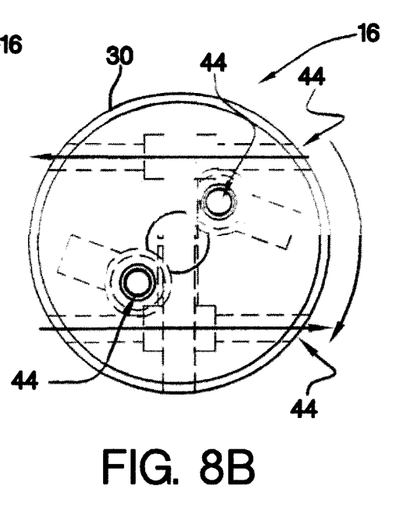
Figure 9A:
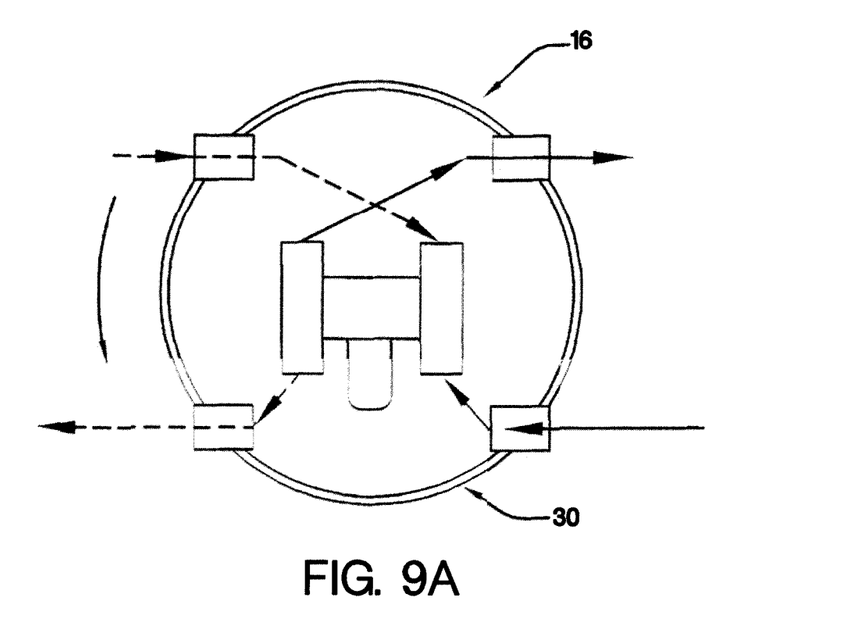
FIGS. 9A and 9B are schematic diagrams of the inspection vehicle according to one exemplary embodiment of the present disclosure wherein one pump operates to rotate the vehicle in a counter-clockwise direction and in a clockwise direction, respectively.
Figure 9B:
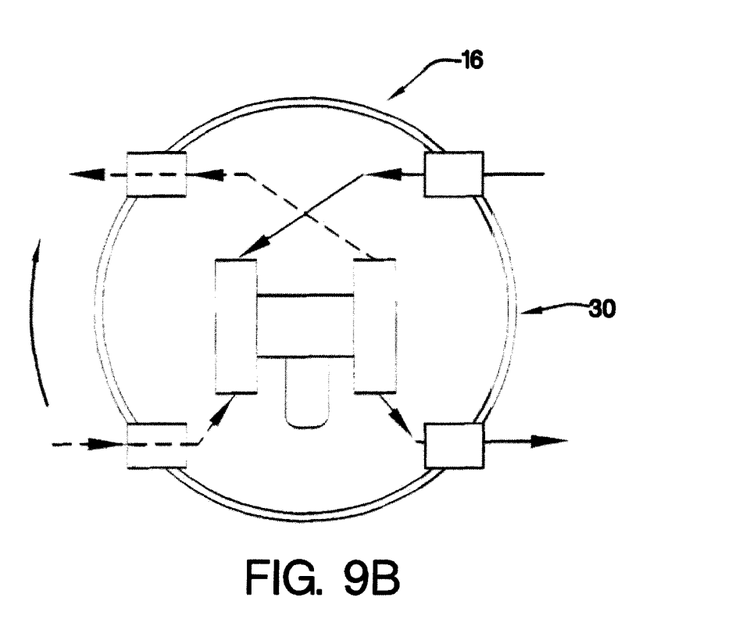

In FIGS. 8A and 8B it can be seen that two pumps under one control allow for rotation of the inspection vehicle 16. In FIG. 8A, by directing the fluid flow in one direction through one channel and an opposite direction in another channel, counter-clockwise rotation can be obtained. By reversing the flows in both channels, clockwise rotation can be obtained as seen in FIG. 8B. In another variation, FIGS. 9A and 9B show rotation of the inspection vehicle 16 utilizing one pump under one control wherein the flow is directed from one side of the inspection vehicle 16 into the inspection vehicle 16 and then back out the same side. A corresponding flow is provided by the opposite side of the inspection vehicle 16 so as to provide for rotation about the Z axis. Reversing the flow provides a corresponding reversal of the rotation of the inspection vehicle 16 along the Z axis.

The inspection vehicle 16 allows for visual and other inspection without draining the transformer oil. This is accomplished by being able to control the inspection vehicle 16 in the oil and perform visual or other inspection through the oil. The inspection vehicle 16 is constructed to be resistant to an oil environment and is properly sealed. Additionally, the inspection vehicle 16 is small enough to be put inside a transformer tank or housing 13 using existing service holes, e.g. those used for filling the transformer oil. As a result, it is not needed to unseal the transformer tank top completely. Another aspect is that the inspection vehicle 16 can be controlled from the outside of the transformer using a joystick 24 and computing device 18 which may also be used for displaying visual data from the sensor(s).

As internal regions of a transformer have no ambient light, the sensor 48 utilizes a supporting light source carried by the inspection vehicle 16. Various wavelengths of light may be used (visible and/or non-visible light) for detailed inspection of the transformer 12 components inside. A remotely controlled arm that guides a thin fiber-optic camera head inside the transformer 12 winding block may also be used. Still another aspect of the inspection vehicle 16 is that all materials employed in the construction of the inspection vehicle 16 are oil compatible. This is to avoid any type of contamination introduced by the inspection vehicle 16, so that the transformer 12 can directly return to operation after the inspection of inspection vehicle 16 without oil treatment.

Figure 10:
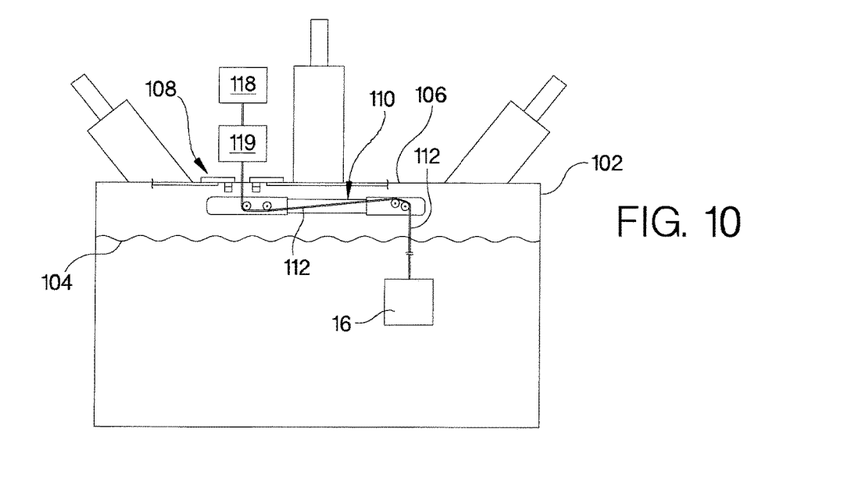
FIG. 10 is a cross-sectional view of a housing 102 with a deployment apparatus for an inspection vehicle according to one exemplary embodiment of the present disclosure.

Referring now to FIG. 10 a tank or housing 102 having liquid 104 disposed therein can be inspected with the inspection vehicle 16. The liquid 104 may include any type of liquid and in some embodiments may provide properties for cooling, or dielectric insulation for certain electrical components (not shown). In one form, the liquid 104 may be mineral oil or the like. The housing 102 includes a top wall 106 with an access port 108 for ingress and egress of a deployment apparatus 110 and the inspection vehicle 16. The deployment apparatus 110 includes a tether 112 that is operable for deploying the inspection vehicle 16 into the housing 102 and for and retracting the inspection vehicle 16 out of the housing 102 after an inspection and/or a maintenance procedure has been completed. In one form a control system 118 can be operably coupled with a reel system 119 to control a position of the deployment apparatus 110, and control the inspection vehicle 16 with the tether 112.

Figures 11A, 11B:
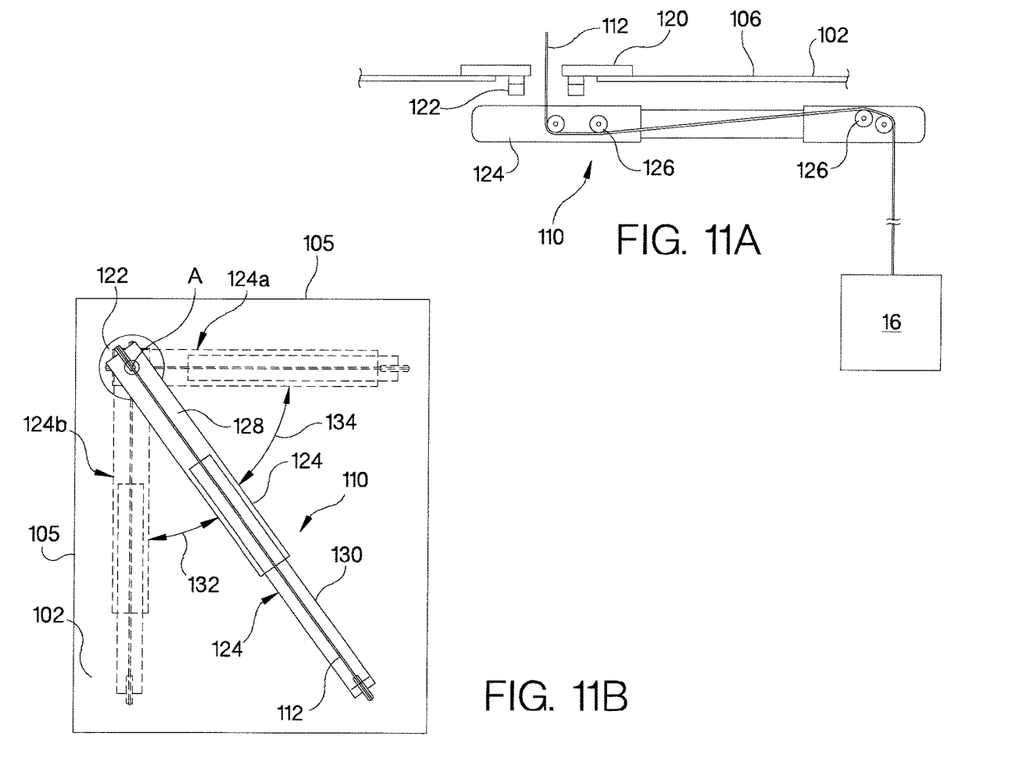
FIG. 11A is a cross-sectional view of a deployment apparatus according to one embodiment of the present disclosure.
FIG. 11B is a top view of the deployment apparatus of FIG. 11A illustrating an extendable telescopic arm being rotatable in a plurality of angular locations.

Referring now to FIG. 11A, an embodiment of a deployment apparatus 110 is shown in cross-sectional form. The deployment apparatus 110 can include a resting fixture 120 configured to engage the top wall 106 of the housing 102. The mount 122, in any of the disclosed embodiments, may be permanently attached or removably coupled to the housing 102 via any number of known mechanical fastening methods or means. A mount 122 extends from the resting fixture 120 and connects with an extendable telescopic arm 124 to provide rotation capability to the arm 124. In some forms the mount 122 is rotatable relative to the housing 102. The tether 112 extends and retracts from the reel system 119 (see FIG. 10) under electronic control through the control system 118, or in an alternate form through manual control means such as a hand crank system (not shown). The tether 112 passes through the access port 108 and slidably engages with the extendable telescopic arm 124 along one or more guide pulleys 126 or similar structure in which the tether 112 may slidingly engage. The tether 112 is operable to provide electrical, mechanical, and/or pneumatic connections with the inspection vehicle 16 so as to provide control and communication capability between the control system 118 and the inspection vehicle 16.

Referring now to FIG. 11B, the extendable telescopic arm 124 can include a plurality of leg segments and in one exemplary embodiment, the telescopic arm 124 includes two leg segments. The telescopic arm 124 can include a first leg segment 128 and a second leg segment 130, however it should be understood that more than two telescopic leg segments can be utilized in other embodiments. As one skilled in the art would understand, while not shown, the telescopic arm 124, as well as other extendable arms described herein, may include actuators, motors, cables, pulleys, biasing members such as springs or the like and other mechanical and electrical apparatus to facilitate movement and positioning of the extendable deployment arm. The rotatable mount 122 is operable for rotating the extendable telescopic arm 124 about an axis A relative to housing 102. Operation of the rotatable mount 127 can be through electrical actuation or through manual actuation as one skilled in the art would readily understand.

The extendable telescopic arm 124 is shown in phantom at first and second alternate locations labeled 124a and 124b on either side thereof. The angles of rotation denoted by doubles arrows 132 and 134 can be varied as desired anywhere from up to 360° depending on location of the rotatable mount 122 relative to the sidewalls 105 of the housing 102. The extendable telescopic arm 124 can be extended and retracted as required to locate the tether 112 and the inspection vehicle 16 in a desired position during deployment, retraction and operation of the inspection vehicle 16 during inspection or maintenance procedures.

Figure 12A:
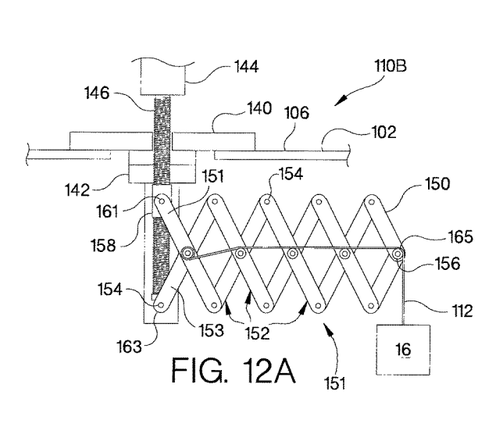
FIG. 12A is a cross-sectional side view of a deployment apparatus according to another exemplary embodiment of the present disclosure.

Referring now to FIG. 12A, another embodiment of a deployment apparatus 110B is illustrated in a side cross-sectional view. The deployment apparatus 110B can include a resting fixture 140 configured to engage with the top wall 106 of the housing 102 with a mount 142 extending therefrom. In some forms, the mount 142 is rotatable relative to the housing 102. An actuator 144 such as a linear actuator or a rotatable actuator having an electric power source, can be engaged with an actuator rod 146 at one end thereof. The actuator rod 146 may be a linear sliding rod or a rotatable threaded rod (lead screw) depending on the type of actuator control.

An extendable scissor jack arm 150 is operably connected to the actuator rod or lead screw 146 at the other end, opposite of the actuator 144. The actuator 144 is configured to extend or retract the scissor jack arm 150 between first and second positions defined as fully retracted and fully extended. In one form the actuator 144 can slide an actuator rod 146 up and down in a vertical direction, and in another form the actuator in the form of an electric motor 144 can rotate a lead screw 146 so as to move first and second ends 161, 163 of pivot links relative to one another, which cause the extendable scissor jack arm 150 to extend or retract. While the exemplary embodiment depicts the actuator rod 146 in a vertical orientation, it should be understood that the actuator rod 146 may be positioned in any orientation and in fact is not limited to a single unitary section, but may include multiple sections with gears, joints or other mechanical apparatus connected therebetween.

The extendable scissor jack arm 150 includes a plurality of pivot links 152 connected together by pivot joints 154 so that each of the links 152 are pivotable with respect to adjacent links 152. The extendable scissor jack arm 150 can also include one or more guide pulleys 156. In some forms, the guide pulleys 156 can include portions that act as a pivot joint between adjacent links 152. The tether 112 can slidingly engage with the one or more guide pulleys 156 while deploying or retracting the inspection vehicle 16 to and from the housing 102.

A prismatic joint 158 can be operably employed by threaded connection with the lead screw 146 at an end of one of the pivot links 152. The prismatic joint 158 causes a first end 161 of a first pivot link 151 of the plurality of pivot links 152 and a first end 163 of a second pivot link 153 of the plurality of pivot links 152 to move together or apart when commanded so as to cause the extendable scissor jack arm 150 to extend and retract in response to the actuator movement. A distal end 165 of the extendable scissor jack arm 150 is shown in a retracted state as illustrated by arrow 151 in FIG. 12A.

Figures 12B, 12C:
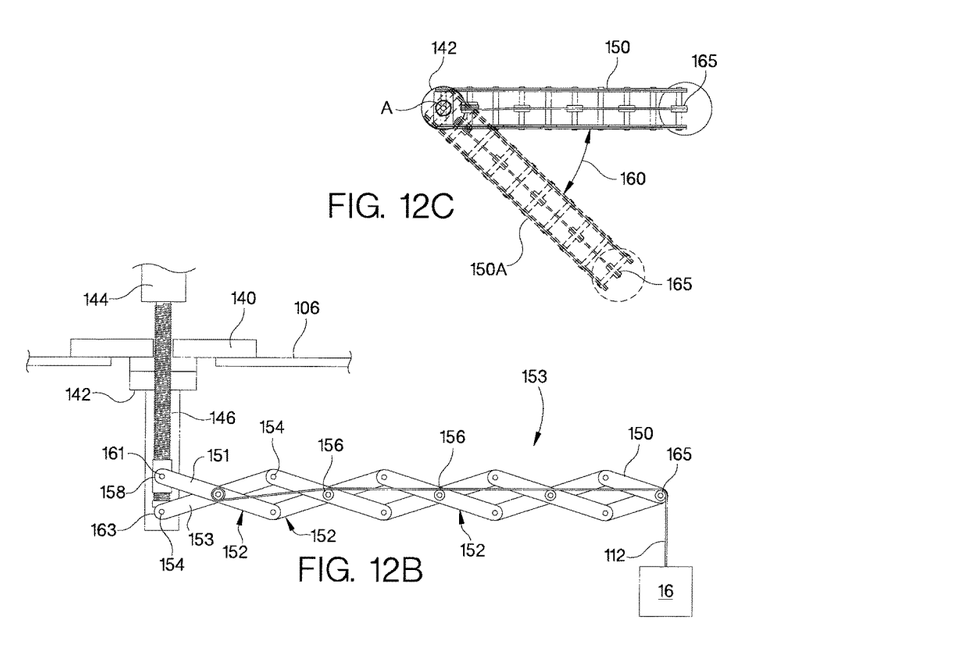
FIG. 12B is a side view of the deployment apparatus of FIG. 12A with an extendable scissor jack arm illustrated in an extended position.
FIG. 12C is a top view of the deployment apparatus of FIG. 12A illustrating an extendable scissor jack arm being rotatable in a plurality of angular locations.

Now referring to FIG. 12B the extendable scissor jack arm 150 is extended in a second fully extended position as illustrated by arrow 153. The prismatic joint 158 at the first end 161 of the first pivot link 151 is moved closer to the first end 163 of the second pivot link 153. The ends 161, 163 of the pivot links 151 and 153 are moved from the first distance shown in FIG. 12A to a second closer distance shown in FIG. 12B such that each of the pivot links 152 pivot in a manner to cause the distal end 165 of extendable scissor jack arm 150 to extend a further distance away from the actuator rod 146. The distal end 165 of the scissor jack arm 150 can be moved to any discrete location between the fully retracted position and the fully extended position.

Referring now to FIG. 12C the extendable scissor jack arm is shown in a first angular location in solid line 150 in a second angular location in phantom line at 150A. The scissor jack arm 150 can be rotatably moved about axis A as defined by angle 160. The rotatable mount 142 is operable for rotating the extendable scissor jack arm 150 about axis A to position the distal end 165 at a desired angular position relative to the housing 102. The rotation angle 160 of the extendable arm 150 can be any angle up to 360°.

Figure 13A:
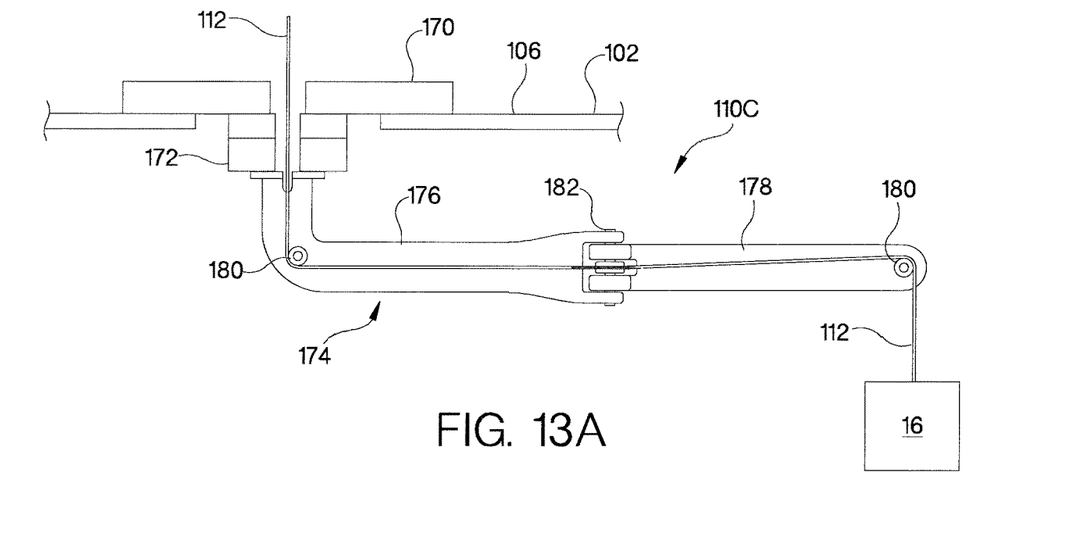
FIG. 13A is a cross-section side view of a deployment apparatus according to another embodiment of the present disclosure.

Referring now to FIG. 13A another embodiment of a deployment apparatus 110C is shown cross-sectional form. The deployment apparatus 110C includes a resting fixture 170 operable for engaging a wall 106 of a housing 102 at least partially filled with liquid (not shown). A mount such as a rotatable mount 172 extends from the resting fixture 170 and can rotatably connect to an extendable articulated arm 174. The extendable articulated arm 174 includes a first leg segment 176 and a second leg segment 178 in the disclosed exemplary embodiment. However, as with previously described embodiments it should be understood that more than two leg segments are contemplated by the present disclosure and in fact may be used without deviating from the teachings herein. The tether 112 can be engaged with one or more guide pulleys 180 so as to slide relative thereto when deploying and retracting the inspection vehicle 16 into and out of liquid filled housing (not shown). The extendable articulated arm 174 can include a pivot joint 182 such that the first and second leg segments 176, 178 can be pivoted relative to each other. In one form, the pivot joint 182 is a two dimensional pivot joint, however in other forms the pivot joint can include a three dimensional or spherical joint which permits adjacent leg segments to move in any angular direction relative to one another. It should be understood that although not shown, electric motors, actuators, cables, gears and other mechanical and electrical apparatus may be employed to cause movement of the leg segments 176, 178.

Figure 13B:
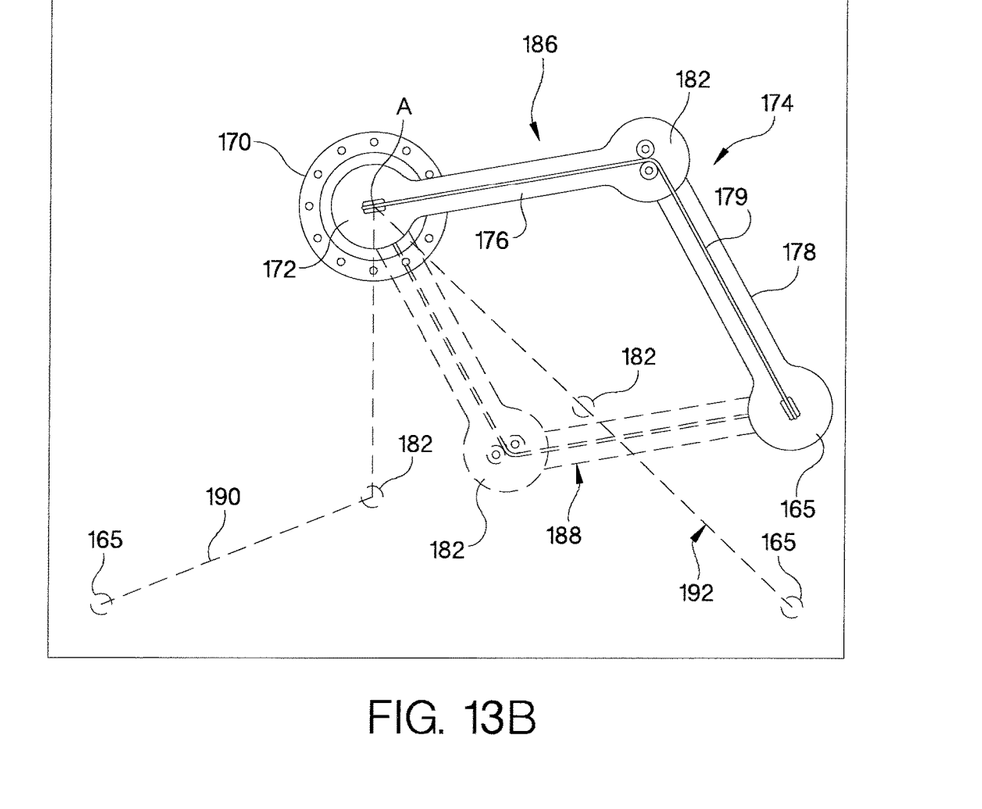
FIG. 13B is a top view of the deployment apparatus of FIG. 13A illustrating an extendable articulated arm being movable in a plurality of positions.

Referring now to FIG. 13B the extendable articulated arm 174 is shown in various orientations to illustrate some of the possible arm positions. The rotatable mount 172 is movable relative to the resting fixture 170 such that the first leg segment 176 is pivotable about axis A within the housing 102. The second leg segment 178 can be rotated or pivoted relative to the first leg segment 176 either via a cable system 179 as one skilled in the art would readily understand, or separate actuators (not shown) operably coupled to one or more pivot joints 182. The first orientation 186 of the extendable articulated arm 174 is shown in solid line. A second orientation 188 of the extendable articulated arm 174 is shown in a dashed outline and illustrates that the distal end 165 of the extendable articulated arm 174 can be located in the same position even when the first and second leg segments 176 and 178 are positioned in different locations. A third orientation 190 is illustrated in dash lines and a fourth orientation 192 is shown in a fully extended configuration wherein the distal end 165 is furthest away from the pivotable mount 172. In this manner the arms 176, 178 can be manipulated so as to maneuver around objects within the housing 102 and ensure that the inspection vehicle 16 can be deployed at a desired location.

In one aspect the present disclosure includes a deployment apparatus for a submersible inspection vehicle comprising: a rotatable mount connectable to a housing configured to hold a liquid; an extendable arm connected to the rotatable mount; and a tether slidably coupled to the extendable arm and adapted to connect with the inspection vehicle during operation.

In refining aspects the extendable arm includes a plurality of telescoping sections operable to extend and retract a distal end of the extendable arm; wherein the extendable arm includes a plurality of scissor jack links operable to extend and retract a distal end of the extendable arm; wherein the extendable arm includes a plurality of elongate articulating legs operable to move relative to one another; comprising a pivot joint connected between adjacent articulating legs; wherein the pivot joint is a spherical joint to permit angular rotation in any direction; an actuator system coupled to the extendable arm; wherein the actuator system includes at least one of an electronic actuator and a mechanical actuator; wherein the actuator system includes at least one of a pulley, a cable and a biasing member; wherein the mount is rotatable and further comprising an electric motor operably coupled to the rotatable mount to control a position of the extendable arm; a resting fixture adapted to engage with a wall of the housing; an actuating rod extending through the resting fixture being operably connected to the extendable arm; a control system operable to release or retract the tether and control movement of the extendable arm during operation of the inspection vehicle; wherein the tether includes at least one of a mechanical, electrical and pneumatic connection operably coupled with the inspection vehicle.

In another aspect the present disclosure includes a method for deploying an inspection vehicle within a housing at least partially filled with a liquid medium, the method comprising: positioning rotatable mount with an extendable arm proximate an access port located in a wall of the housing; running a tether line between a control mechanism and the inspection vehicle; rotating the arm with the rotatable mount to a desired angular location; moving a distal end of the extendable arm to a desired distance from the rotatable mount; and lowering the inspection vehicle into liquid medium with the tether line.

In refining aspects the method includes sending control signals to the inspection vehicle through the tether line; moving the vehicle through the liquid in response to the control signals; moving the extendable arm in response to movement of the inspection vehicle; and maneuvering the tether around components internal to the housing with the extendable arm.

In another aspect the present disclosure includes a deployment system for an inspection vehicle comprising: a resting fixture configured to engage with a housing over an aperture formed in a wall of the housing; a mount extending from the resting fixture being configured to fit through the aperture; an extendable arm connected to the mount; a tether engaged along portions of the extendable arm, the tether connectable with the inspection vehicle; and a control mechanism operable to deploy the inspection vehicle from the extendable arm into a liquid medium within the housing.

In refining aspects the extendable arm includes a plurality of telescoping sections operable to extend and retract relative to the mount; wherein the extendable arm includes a scissor jack mechanism to extend and retract relative to the mount; wherein the extendable arm includes a plurality of elongate articulating legs; a pivot joint connected between adjacent articulating legs; wherein the mount is rotatable relative to the housing; an actuator system coupled to the extendable arm, the actuator system operable to move portions of the extendable arm; wherein the actuator system includes at least one of an electronic actuator and a mechanical actuator; wherein the electric actuator is one of a linear actuator and a rotating actuator; wherein the actuator system further comprises an actuator rod connected to the extendable arm; and wherein the control system is operable to move the extendable arm in response to movement of the inspection vehicle.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A deployment apparatus for a submersible inspection vehicle comprising:
    a rotatable mount connectable to a housing that is configured to hold a liquid;
    an extendable arm connected to the rotatable mount; and
    a tether slidably coupled to the extendable arm and adapted to connect with the submersible inspection vehicle during operation,
    wherein the submersible inspection vehicle is disposed within the housing and is configured to be deployed via the extendable arm.

2. The deployment apparatus of claim 1, wherein the extendable arm includes a plurality of telescoping sections operable to extend and retract a distal end of the extendable arm.

3. The deployment apparatus of claim 1, wherein the extendable arm includes a plurality of scissor jack links operable to extend and retract a distal end of the extendable arm.

4. The deployment apparatus of claim 1, wherein the extendable arm includes a plurality of elongate articulating legs operable to move relative to one another.

5. The deployment apparatus of claim 4 further comprising a pivot joint connected between adjacent articulating legs.

6. The deployment apparatus of claim 5, wherein the pivot joint is a spherical joint to permit angular rotation in any direction.

7. The deployment apparatus of claim 1, further comprising an actuator system coupled to the extendable arm.

8. The deployment apparatus of claim 7, wherein the actuator system includes at least one of an electronic actuator and a mechanical actuator.

9. The deployment apparatus of claim 7, wherein the actuator system includes at least one of a pulley, a cable and a biasing member.

10. The deployment apparatus of claim 1, wherein the mount is rotatable; and further comprising an electric motor operably coupled to the rotatable mount to control a position of the extendable arm.

11. The deployment apparatus of claim 1, further comprising: a resting fixture adapted to engage with a wall of the housing; and an actuating rod extending through the resting fixture being operably connected to the extendable arm.

12. The deployment apparatus of claim 1, further comprising a control system operable to release or retract the tether and control movement of the extendable arm during operation of the inspection vehicle.

13. The deployment apparatus of claim 1, wherein the tether includes at least one of a mechanical, electrical and pneumatic connection operably coupled with the inspection vehicle.

14. A method for deploying an inspection vehicle within a housing at least partially filled with a liquid medium, the method comprising:
    positioning a rotatable mount with an extendable arm proximate an access port located in a wall of the housing;
    running, via a distal end of the extendable arm, a tether line between a control mechanism and the inspection vehicle;
    rotating the arm with the rotatable mount to a desired angular location;
    moving the distal end of the extendable arm to a desired distance from the rotatable mount; and
    lowering the inspection vehicle into the liquid medium with the tether line.

15. The method of claim 14 further comprising sending control signals to the inspection vehicle through the tether line.

16. The method of claim 15 further comprising moving the vehicle through the liquid in response to the control signals.

17. The method of claim 16 further comprising moving the extendable arm in response to movement of the inspection vehicle.

18. The method of claim 14, further comprising maneuvering the tether around components internal to the housing with the extendable arm.

19. A deployment system for an inspection vehicle comprising: a resting fixture configured to engage with a housing over an aperture formed in a wall of the housing; a mount extending from the resting fixture being configured to fit through the aperture; an extendable arm connected to the mount; a tether engaged along portions of the extendable arm, the tether connectable with the inspection vehicle; and a control mechanism operable to deploy the inspection vehicle from the extendable arm into a liquid medium within the housing.

20. The deployment system of claim 19 wherein the extendable arm includes a plurality of telescoping sections operable to extend and retract relative to the mount.

21. The deployment system of claim 19, wherein the extendable arm includes a scissor jack mechanism to extend and retract relative to the mount.

22. The deployment system of claim 19, wherein the extendable arm includes a plurality of elongate articulating legs.

23. The deployment system of claim 22 further comprising a pivot joint connected between adjacent articulating legs.

24. The deployment system of claim 19, wherein the mount is rotatable relative to the housing.

25. The deployment system of claim 19, further comprising an actuator system coupled to the extendable arm, the actuator system operable to move portions of the extendable arm.

26. The deployment system of claim 25, wherein the actuator system includes at least one of an electronic actuator and a mechanical actuator.

27. The deployment system of claim 26, wherein the electric actuator is one of a linear actuator and a rotating actuator.

28. The deployment system of claim 25 wherein the actuator system further comprises an actuator rod connected to the extendable arm.

29. The deployment system of claim 19, wherein the control system is operable to move the extendable arm in response to movement of the inspection vehicle.

* * * * *